United States Patent
Wilson et al.

(10) Patent No.: US 6,853,842 B1
(45) Date of Patent: Feb. 8, 2005

(54) SYSTEM AND METHOD FOR USING MOBILE STATION SIGNAL STRENGTH MEASUREMENTS TO COLLECT RADIO FREQUENCY ISOLATION DATA IN A CELLULAR NETWORK

(75) Inventors: James Eric Wilson, Richardson, TX (US); Jill R. Baumann, Wylie, TX (US)

(73) Assignee: Nortel Networks Limited, St. Laurent (CA)

( * ) Notice: Subject to any disclaimer, the term of this patent is extended or adjusted under 35 U.S.C. 154(b) by 554 days.

(21) Appl. No.: 09/629,787

(22) Filed: Jul. 31, 2000

(51) Int. Cl.$^7$ ................................................. H04Q 7/20
(52) U.S. Cl. ...................... 455/423; 455/424; 455/425; 455/67.11; 455/67.13; 455/67.14
(58) Field of Search ................................ 455/423, 424, 455/425, 67.11, 67.4, 67.6, 226.1, 435.2, 452.2, 446, 437, 447

(56) References Cited

U.S. PATENT DOCUMENTS

| | | | |
|---|---|---|---|
| 5,594,949 A | * | 1/1997 | Anderson et al. |
| 6,480,718 B1 | * | 11/2002 | Tse .............................. 455/446 |
| 6,496,700 B1 | * | 12/2002 | Chawla et al. |
| 2001/0046879 A1 | * | 11/2001 | Schramm et al. |

* cited by examiner

Primary Examiner—David Hudspeth
Assistant Examiner—Huy D Nguyen

(74) Attorney, Agent, or Firm—Garlick, Harrison & Markison, LLP; Bruce Garlick

(57) ABSTRACT

A system and method collects radio frequency isolation values with the assistance of mobile stations operating within a cellular wireless communication system. A broadcast channel and a broadcast cell/sector are first chosen. Then, the broadcast channel is disabled in neighboring (or all) other cells/sectors in the system. The base station servicing the broadcast cell/sector then transmits on the broadcast cell sector. Mobile stations operating within the system are then directed to measure and report the signal strength of the broadcast channel as well as a traffic channel servicing their ongoing calls. The mobile stations then report these signal strengths to the cellular wireless communication system. The signal strength measurements are then used to calculate cell/sector radio frequency isolation values between the broadcast cell/sector and respective servicing cell/sectors. Because the broadcast channel may be transmitted at a greater level than normal transmissions, a normalization process may be required. This process is then repeated for each cell/sector in the system so that cell/sector radio frequency isolation values may be collected for these other cells/sectors. Finally, all collected cell/sector isolation values are processed and complied to create an isolation matrix.

21 Claims, 7 Drawing Sheets

SYSTEM AND METHOD FOR USING MOBILE STATION SIGNAL STRENGTH MEASUREMENTS TO COLLECT RADIO FREQUENCY ISOLATION DATA IN A CELLULAR NETWORK

BACKGROUND

1. Technical Field

The present invention relates generally to cellular wireless networks; and more particularly to the characterization of radio frequency propagation in a cellular wireless network and use of such characterization in radio frequency channel reuse planning.

2. Related Art

Cellular wireless networks are generally known to include a "network infrastructure" that facilitates wireless communications with mobile stations operating within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC), which also couples to the PSTN, the Internet and/or to other MSCs.

A wireless mobile station operating within the service coverage area communicates with one or more of the base stations. The base stations route the communications to the serving MSC via a serving BSC. The MSC routes the communications to another subscribing wireless unit via a BSC/base station path (which may be the same BSC/base station path when the communications are with another subscribing unit serviced by the same base station) or via the PSTN/Internet/other network to terminating destination.

Various interface standards have been developed to standardize wireless communications so that equipment of differing vendors may interface. Wireless communication interface standards include, for example, the Advanced Mobile Phone Service (AMPS) standards, the Global Standards for Mobility (GSM), the Code Division Multiple Access (CDMA) and the Time Division Multiple Access (TDMA) standards. These operating standards set forth the technical requirements that facilitate compatible operation between equipment of differing vendors.

The government allocates the system operator a radio frequency (RF) spectrum within which to support all wireless communications in the service coverage area. This RF spectrum is then subdivided into a plurality of RF channels, each RF channel centered about a respective carrier frequency and separated from adjacent carrier frequencies by a separation bandwidth. Each RF channel is able to carry a maximum traffic limit, the limit dependent upon the characteristics of the RF channel.

In order to increase the capacity of the system, RF channels are reused across the cellular wireless communication system. Each cell is allocated one or more particular RF channels, the number of which is a function of load. The number of available RF channels is limited, however, and in order to satisfy system-loading requirements, RF channels are reused across the system. Such reuse of RF channels, results in interference between cells using the same RF channel.

Because of interference between cells/sectors using the same RF channel, sufficient RF isolation must exist between the cells/sectors. RF isolation is typically referred to as a carrier to interference (C/I) ratio and expressed in decibels. The RF isolation between cells/sectors is dependent upon a number of factors including topology, geography, base station placement, presence or absence of obstacles, and other factors. A larger C/I ratio indicates better RF isolation between a cell/sector. The ability to reuse RF channels depends upon the RF isolation between cells/sectors. An "Isolation Matrix" includes the RF isolation of each cell/sector pair in the cellular wireless network or a subset of cells/sectors in the cellular wireless network. This Isolation Matrix may be employed to determine a frequency reuse pattern that is deployed within the cellular wireless network.

Prior techniques for determining components of the Isolation Matrix included what is referred to as "drive testing." With drive testing measurement, an RF channel corresponding to a cell/sector under test is "keyed up" to a particular transmission level. A drive-testing vehicle equipped with an RF receiver and a positioning system, such as a Global Positioning System (GPS) device, is then used to measure the strength of the keyed up RF channel and the associated interference in a plurality of other cells/sectors across the system. This procedure is then repeated for other cells/sectors in the system until enough data has been collected to create the Isolation Matrix. This technique is expensive, slow and ties up RF channels all during the testing.

However, such drive testing suffered numerous shortcomings. To obtain a good set of data, several attempts to collect the data were generally required. Further, drive testing required 100% coverage of the network, which took considerable effort and expense to achiever. Because drive testing procedures required that a particular RF channel be made unavailable across the system, due to reduced system capacity during the drive testing, substantial revenue was lost during the testing. Also, since all measurements were made from a vehicle, only in-car coverage was included and no in-building or pedestrian traffic was considered. Moreover, since drive testing was performed over several weeks (or even months) network characteristics changed during the testing period. Finally, the drive testing effort required extensive planning and scheduling of resources.

Thus, there is a need in the art for a system and method that may be employed to gather data for the creation of an Isolation Matrix for use in RF reuse planning. This system and method should be simple, efficient, and inexpensive and consume a minimum of system resources.

SUMMARY OF THE INVENTION

Thus, to overcome the shortcomings of the prior systems, among other shortcomings, a system and method of the present invention allows radio frequency isolation measures to be performed with the assistance of mobile stations operating within a cellular wireless communication system. As a first step in this operation, a broadcast channel and a broadcast cell/sector are chosen. In one embodiment, the broadcast channel is selected from a plurality of traffic channels assigned to the broadcast cell/sector. Then, the broadcast channel is disabled in neighboring (or all) other cells/sectors in the system. As an option, traffic channels adjacent the broadcast channel are disabled in neighboring cells/sectors to avoid interference. The base station servicing the broadcast cell/sector then transmits on the broadcast cell sector.

Mobile stations operating within the system are then directed to measure and report the signal strength, of the broadcast channel as well as a traffic channel servicing their ongoing calls. In an alternate operation, for mobile stations not currently servicing calls, the mobile stations are directed to measure the signal strength of the broadcast channel and another pertinent channel. The mobile stations then report these signal strengths to the cellular wireless communication system. These reports may come in from all cell/sectors of the system or a subset thereof.

The signal strength measurements are then used to calculate cell/sector radio frequency isolation values between the broadcast cell/sector and respective servicing cell/sectors. Because the broadcast channel may be transmitted at a greater level than normal transmissions, a normalization process may be required. This process is then repeated for each cell/sector in the system so that cell/sector radio frequency isolation values may be collected for these other cells/sectors. Finally, all collected cell/sector isolation values are processed and compiled to create an isolation matrix.

The operations of the present invention provide significant benefits over the prior techniques. Collection of isolation data according to the present invention may be performed much more quickly, less expensively and with less manual intervention than the prior techniques. Further, the data collected better represents actual RF conditions within the cellular wireless system. Such is the case because a large number of mobile stations participate in the data collection process and because the participating mobile stations include vehicle based mobile stations and hand-held mobile stations. Thus, the data collected represents pedestrian traffic as well as vehicle traffic and includes data collected from mobile stations operating on roadways, sidewalks, and within buildings, among other locales. The data collected is therefore much more valuable than the data collected using prior techniques.

Moreover, the operations of the present invention may be repeated a number of times with minimal system impact. Collected data therefore provides time and traffic diverse bases, e.g., light traffic, heavy traffic, morning, daytime, evening, weekend, etc. The collected data is therefore much more representative of system conditions than the data collected by drive testing and other prior techniques. Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
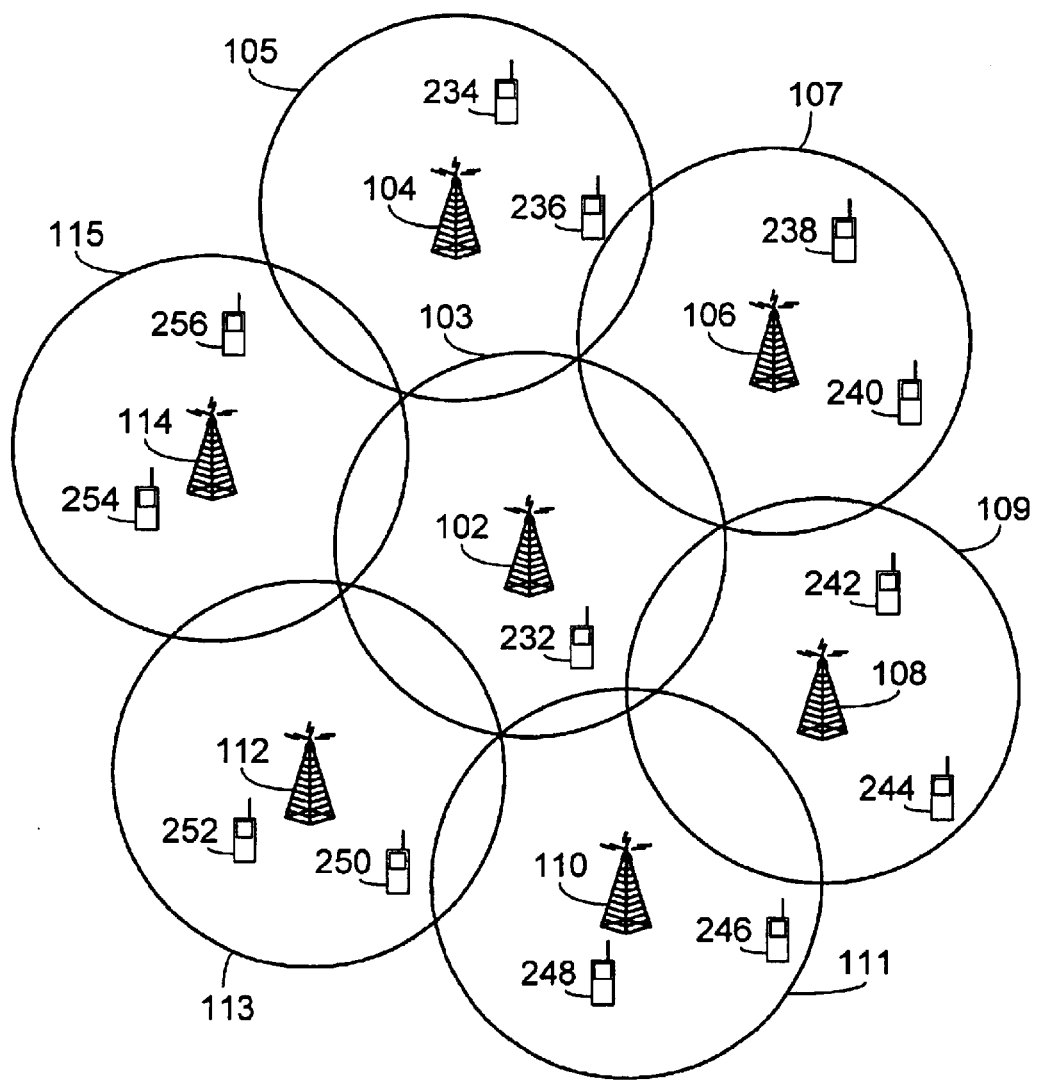
FIG. 1 is a system diagram illustrating a portion of a cellular wireless communication system in which the method of the present invention is employed to measure cell pair RF isolation.
Figure 6:
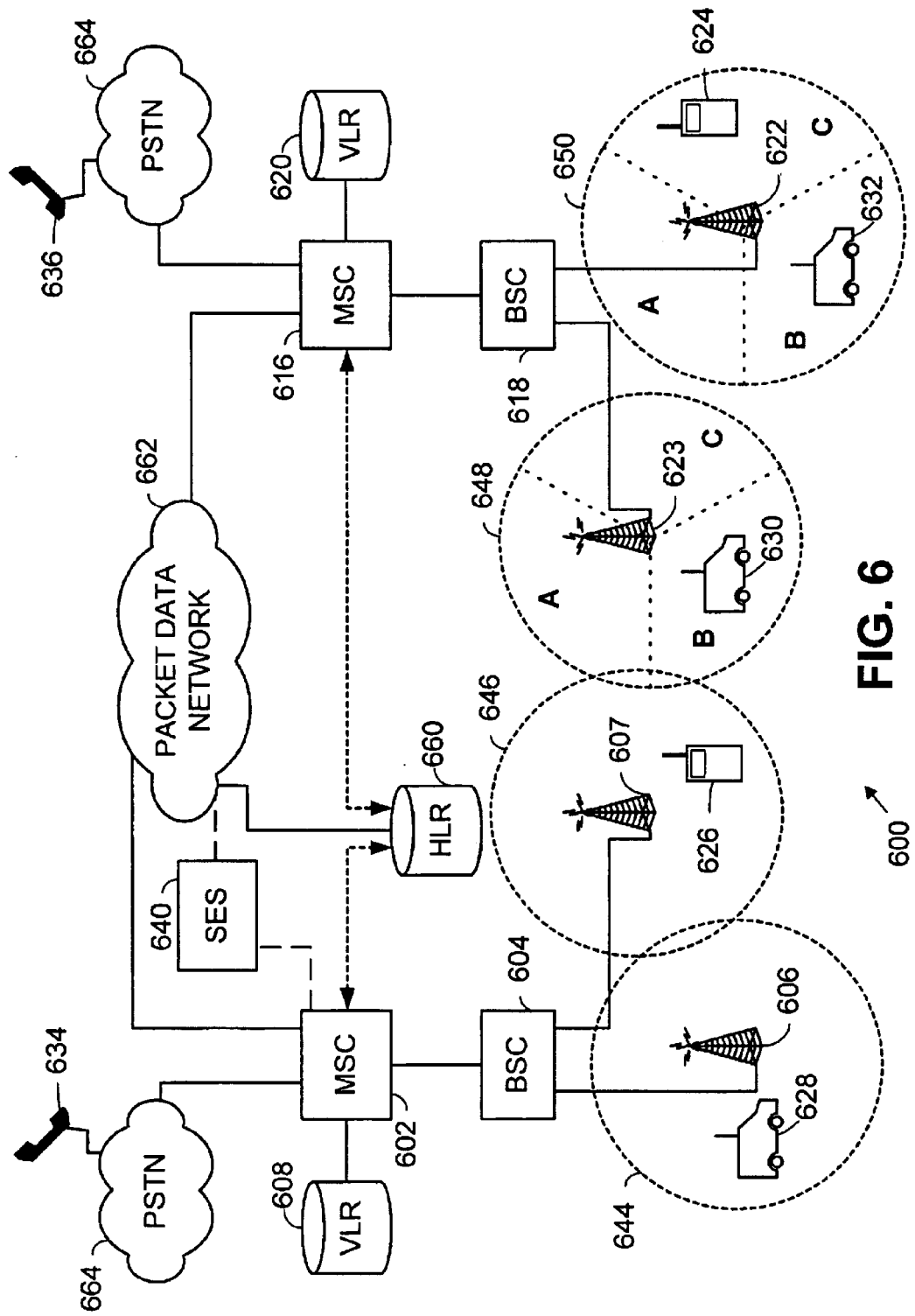
FIG. 6 is a system diagram illustrating a cellular wireless communication system within which operation according to the present invention may be employed.

FIG. 1 is a system diagram illustrating a portion of a cellular wireless communication system in which the method of the present invention is employed to measure cell pair RF isolation. The portion of the wireless communication system illustrated includes base station 102 surrounded by base stations 104, 106, 108, 110, 112 and 114. Base station 102 supports wireless communications within a respective cell 103. Likewise, base stations 104, 106, 108, 110, 112 and 114 support wireless communications within respective cells 105, 107, 109, 111, 113 and 115. For simplicity in illustration, additional elements the wireless communication system are not shown. However, similar elements are shown in FIG. 6 and are otherwise known in the art. Further, each of the base stations 102, 104, 106, 108, 110, 112 and 114 may also support wireless communications within a plurality of sectors (not shown), as is also known.

In a system operating according to the TDMA operating standard, a Metropolitan Service Area (MSA) is allocated a certain bandwidth within the 800 MHz band or the 1900 MHz band. Of this bandwidth, a total of 416 total RF channels may be allocated, for example. In this example, 21 to 32 of these RF channels are deployed in each sector that is serviced by a particular base station. Further, in this example, 50 KHz separates the center frequencies of adjacent channels. These available RF channels service forward link broadcasts, forward link control, reverse link control, forward link traffic and reverse link traffic.

According to the present invention, RF isolation between RF channels is determined with the assistance of mobile terminals 234, 236, 238, 240, 242, 244, 246, 248, 250, 252, 254 and 256. In this operation, a particular radio frequency (RF) traffic channel is selected as a beacon channel (B-CH). The B-CH has a particular center frequency and a particular bandwidth. The B-CH is disabled at the other base stations 104–114 so that none of the other base stations 104–114 transmit on the B-CH. In this operation, the B-CH is reserved for collecting RF cell-pair isolation data using the method of the present invention. In one operation, RF channels residing adjacent the B-CH in the frequency spectrum are also disabled at the base station 102 and/or the other base stations 104–114. Such disablement is performed to avoid interference in the adjacent RF channels by the B-CH, which is transmitted at an above-normal power level in such case.

The base station 102 then keys-up the B-CH at full transmit power, which may be greater than normal transmit power. Mobile stations 234–256 currently service calls via serving base stations 104–114. However, these mobile stations 234–256 are serviced on RF channels other than the B-CH. While the B-CH is keyed up, the mobile stations 234–256 are instructed to measure the strength of both the B-CH and the respective serving RF traffic channels. The measured strengths are then reported via base stations 104–114 and collected at a central location within cellular wireless communication the system. The ratio of these measurements is then used to determine forward link carrier-to-interference (C/I) ratios for the respective cell pairs.

In a particular example of this operation, mobile station 242, serviced by base station 108, is instructed to measure the strength of both the B-CH and the RF channel servicing its call. The mobile station 242 measures the strength of these channels and reports the strengths to the cellular wireless communication system via base station 108. The reported measurements provide a basis for calculating the C/I ratio between cell 109 serviced by base station 108 and cell 103 serviced by base station 102. Likewise, a measurement taken by mobile station 248 being serviced by base station 110 is used to calculate the C/I ratio between cell 111 serviced by base station 110 and cell 103 serviced by base station 102.

As will be described further with respect to FIGS. 2–5, the B-CH transmission/mobile station measurement operations are repeated for each cell (or sector) within the cellular wireless communication system to collect enough information to construct an isolation matrix for the system. Further, the total process may be repeated over time to consider variations that exist due to differing traffic patterns and other system conditions. This process may also be repeated using different B-CH frequencies for each cell. These operations may consider each sector within each cell separately.

In one operation, a plurality of different B-CH frequencies is simultaneously used in a respective plurality of beacon cells/sectors. In this case, RF cell/sector pair isolation data is simultaneously collected for the plurality of beacon cells/sectors. Using this technique, the total system capacity is reduced further. However, the duration of the overall testing period is significantly reduced.

In causing the mobile stations to measure and report the strength of the received B-CH transmissions, a Mobile Assisted Handoff (MAHO) message may be employed. The Mobile Assisted Channel Assignment (MACA) message may be employed to support the described operations in other embodiments. Further, in still other operations, other messages may be employed.

Figure 2:
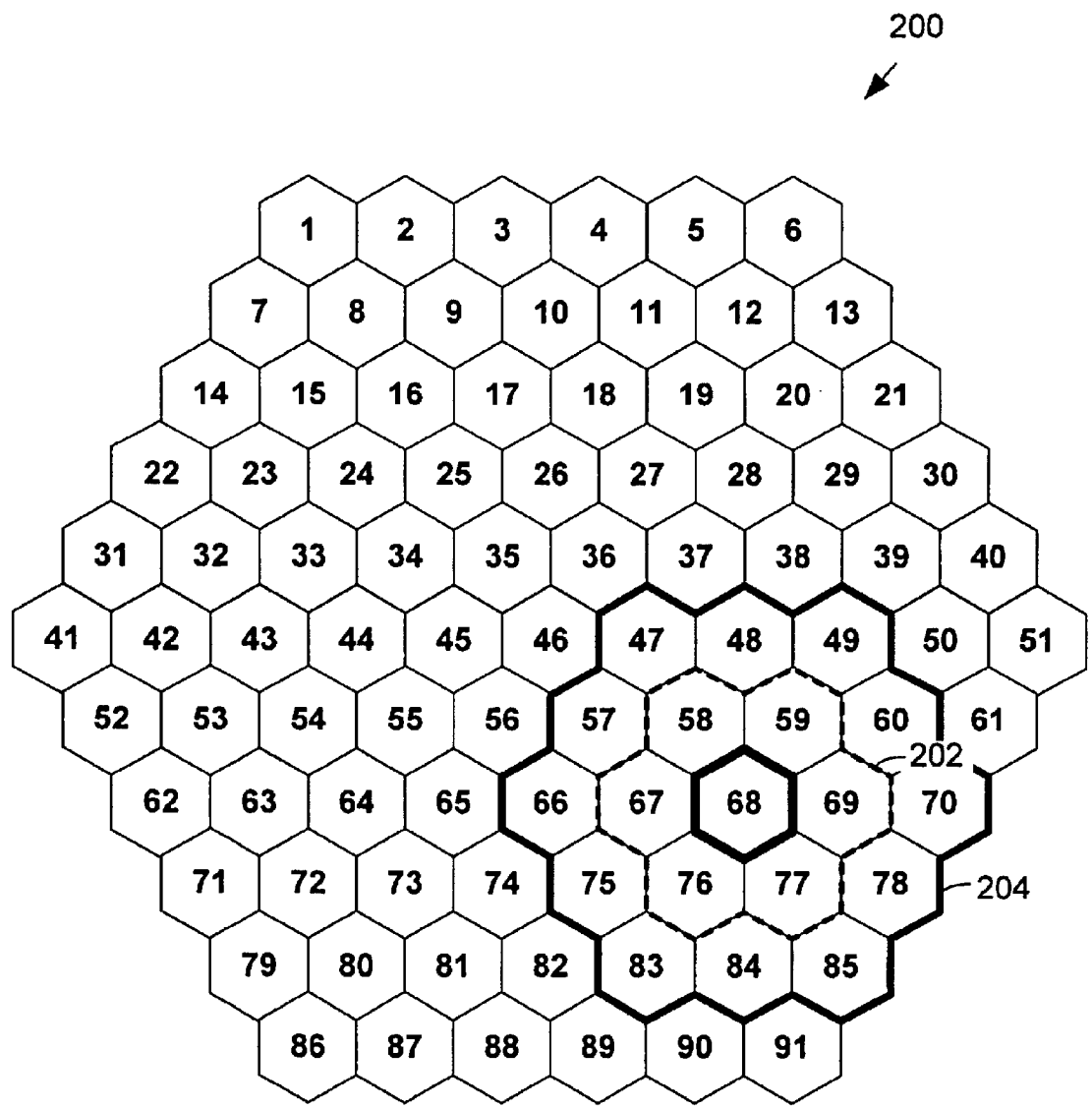
FIG. 2 is a block diagram illustrating the cell layout of a cellular wireless communication system with which the present invention is employed to determine cell pair RF isolation.

FIG. 2 is a block diagram illustrating the cell layout of a cellular wireless communication system with which the present invention is employed to determine cell pair RF isolation. The cellular layout of FIG. 2 includes 91 cells.

In an RF reuse engineering operation, an isolation matrix must be first constructed so that an RF reuse plan may be designed and deployed. This isolation matrix includes elements for each sector in the system. In one example, each of the cells includes 3 sectors, such that the system includes a total of 273 sectors. In creating such an isolation matrix, the process described with reference to FIG. 1 is repeated for each of the 273 sectors (at least once) and the data collected is used to construct an isolation matrix for the system. Construction of the isolation matrix will be further described with reference to FIG. 5.

In an example of operation according to the present invention, cell 68 is used to transmit on the B-CH. Cells 58, 59, 67, 69, 76 and 77 (referenced as cell group 202) are adjacent to cell 68. Thus, in cell 68 and cell group 202, RF channels adjacent the B-CH are disabled. Further, the B-CH is disabled in cell group 202 and those cells referenced as cell group 204 (cells 47–49, cells 57–60, cells 66–67, cells 69–70, cells 75–78 and cells 83–85). Within cell group 202 and cell group 204, including cell 68, active mobile stations make measurements. In making these measurements, the active mobile stations measure the strength of the B-CH as well as the strength of respective serving traffic channels. These values are then reported and compiled.

While measurements taken in all cells except cell 68 are later used to create the isolation matrix, the measurements taken in cell 68 are used to confirm that the B-CH is viable for cell 68 and to confirm that the B-CH is being correctly transmitted. In an operation where multiple B-CHs are simultaneously transmitted from multiple beacon cells/sectors, a mobile station operating in cell 68 collects data that is used both to confirm the correct operation of the B-CH of cell 68 and to collect RF isolation data for the other cell/sector transmitting on another B-CH. In this operation, mobile stations operating in cell 47, for example, would collect and report data used in determining RF cell/sector pair isolation data for both beacon cells/sectors.

In another operation, all active mobile stations across the system (in cells 1–67 and 69–85) measure and report the strength of the B-CH and respective serving traffic channels. In determining in which cells measurements should be taken, the distance of a serving base station for the cell, known isolation between the cells, or other consideration may be used. In this decision process, a tradeoff is made between the system resources that are consumed by the testing and the value of measured data.

Figure 3:
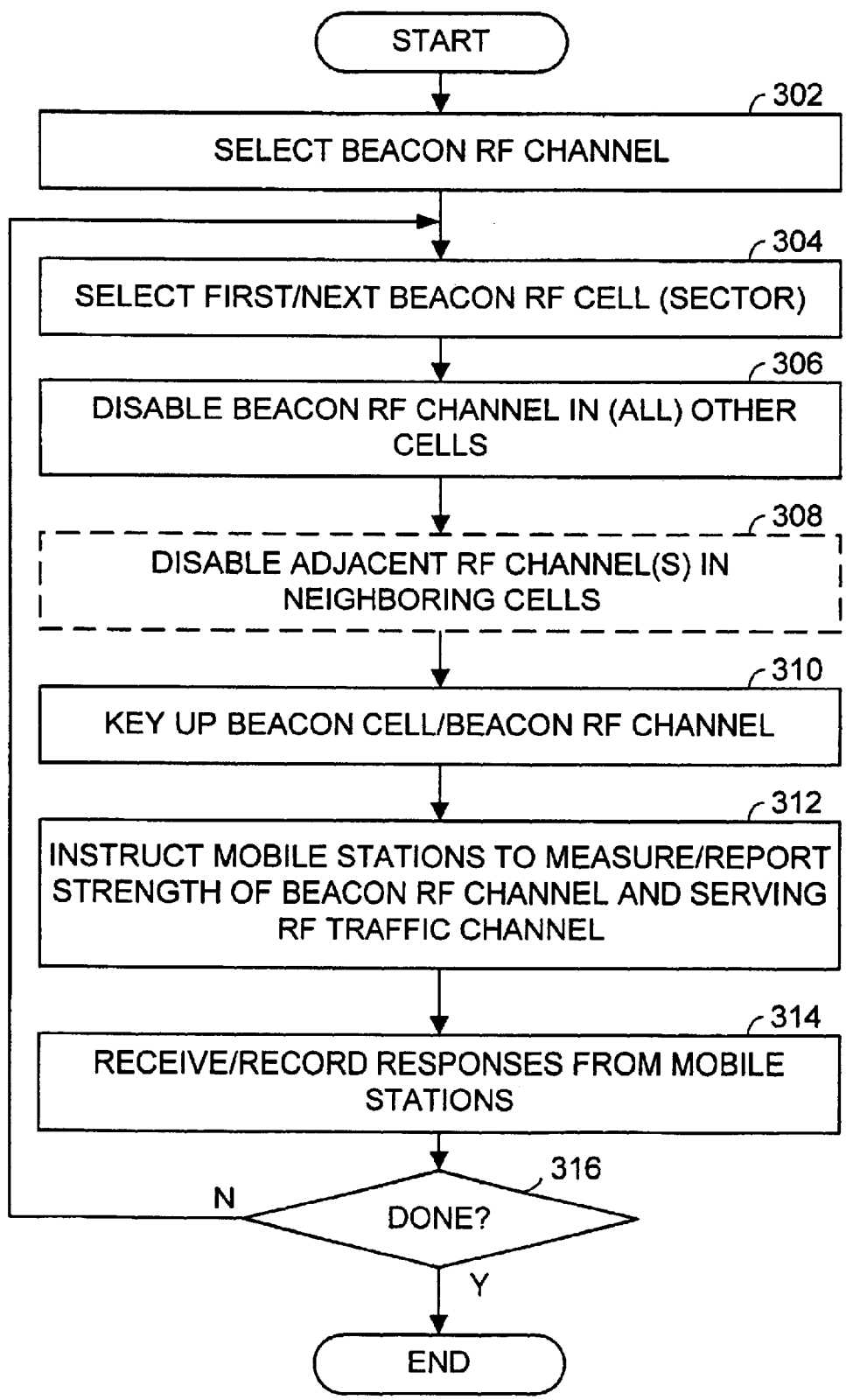
FIG. 3 is a logic diagram illustrating operation according to the present invention in determining cell pair RF isolation.

FIG. 3 is a logic diagram illustrating operation according to the present invention in determining cell pair RF isolation. Operation commences with the selection of the B-CH (step 302). In the operation of FIG. 3, the B-CH is a particular RF channel that is used throughout the duration of the testing. Then, a first beacon RF cell (or sector) is chosen (step 304). Next, the B-CH is disabled in some or all of the other cells in the system (step 306). Optionally, adjacent RF channel(s) in neighboring cells and/or the beacon RF cell are disabled (step 308). Disabling adjacent RF channels eliminates adjacent channel interference caused by the B-CH. However, such RF channel disablement reduces system capacity in the affected cells/sectors.

Then, the B-CH is keyed up to maximum transmission power at the transmitting cell (step 310). In another operation, B-CH transmissions are made at less than maximum transmission power. However, when the B-CH transmissions are made at a lesser transmit power, a fewer number of mobile stations will be able to detect and measure the B-CH. Reduction in B-CH transmit power therefore reduces the amount of data collected and thus reduces the value of the data collected. Further, reduction of B-CH transmit power also reduces the accuracy obtainable by mobile stations that do measure its signal strength.

Once the B-CH is keyed up, some or all of the base stations in the system then instruct their serviced mobile stations having active calls to report a measured strength of their respective serving RF channels and the B-CH (step 312). These responses are then received by the system and stored for further use (step 314). Once all of the responses have been received, a determination is made as to whether each cell (or sector) in the system has been operated upon (step 316). If not, operation returns to step 304 where a next cell (or sector) is chosen and operation proceeds therewith. If all cells (or sectors) have been operated upon, as determined at step 316, operation ends.

Figure 4:
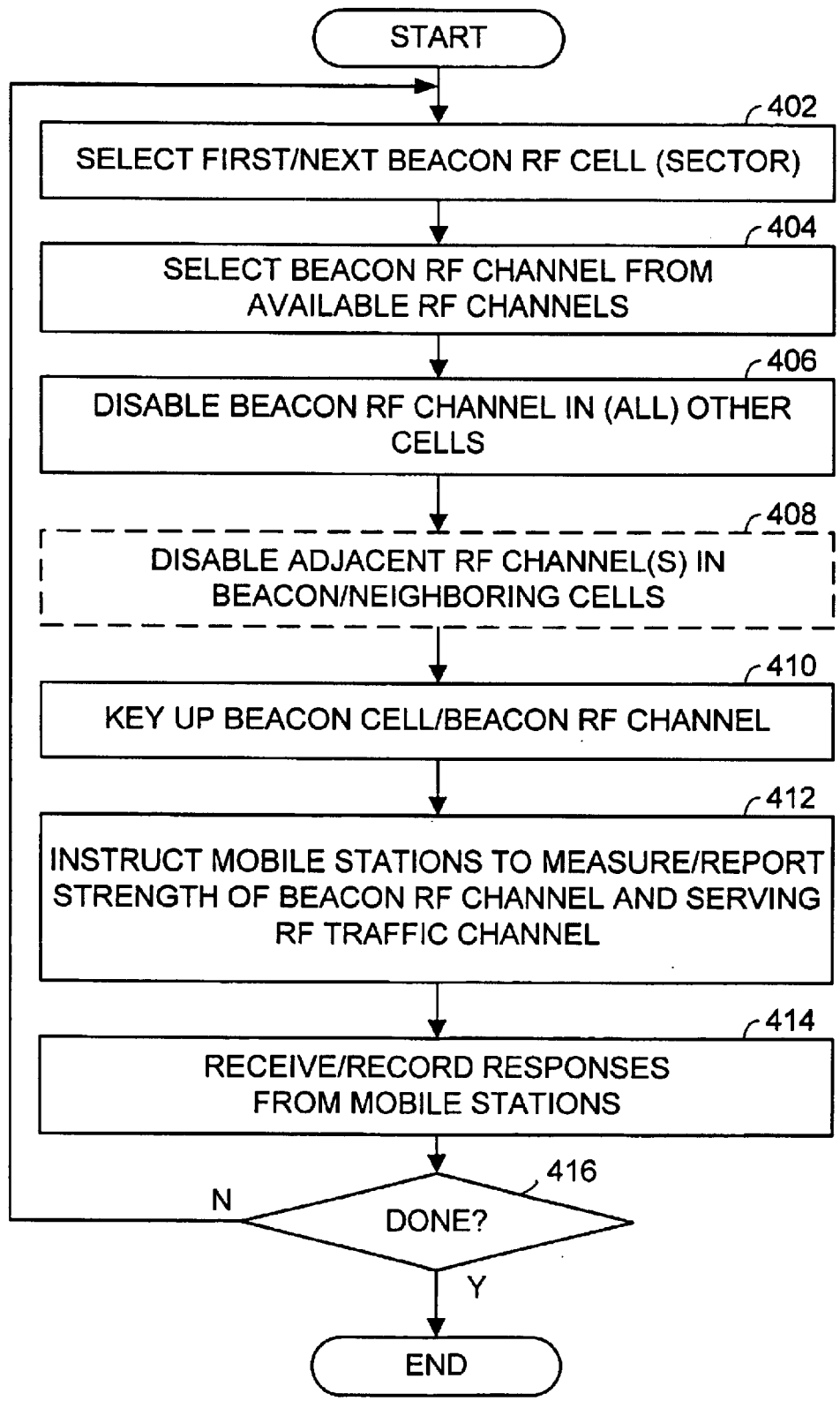
FIG. 4 is a logic diagram illustrating an alternate embodiment of a cell pair RF isolation determination method according to the present invention.

FIG. 4 is a logic diagram illustrating an alternate embodiment of a cell pair RF isolation determination method according to the present invention. The operation i; illustrated in FIG. 4 differs from that of FIG. 3 in that different B-CH frequencies are altered for different cells (or sectors) throughout the system. These operations are performed when a single RF channel is not available across fib the system at all cells (or sectors).

In many cellular wireless systems, this operation will be required because one B-CH frequency will not be available system-wide. However, it is advantageous to use a single B-CH frequency as long as possible during a testing cycle in such a system to reduce the complexity, cost and impact of the testing process. Using a single B-CH frequency may also increase the value of the data collected because of the uniform RF testing frequency employed.

Operation commences with the selection of a first beacon RF cell (or sector) (step 402). Then, a B-CH frequency is chosen from those available at the cell (or sector) (step 404). Then, the B-CH is disabled in some or all of the other cells in the system (step 406). Then, optionally, adjacent RF channel(s) in neighboring cells and/or the first B-CH cell are disabled (step 408).

Then, the B-CH is keyed up to maximum power (step 410) or something less than maximum power in another operation. Some or all of the base stations in the system then instruct mobile stations servicing calls to report a measured strength of their respective serving RF channels and the B-CH (step 412). These responses are then received and stored (step 414). Once all of the responses have been received, a determination is made as to whether each cell (or sector) in the system has been operated upon (step 416). If not, operation returns to step 402 where a next cell (or sector)+is chosen and operation proceeds therefore. If all cells (or sectors) have been operated upon, as determined at step 416, operation ends.

In the operation of FIG. 4, multiple beacon cells/sectors may be selected for simultaneous operation, each of the multiple beacon cells/sectors being assigned a particular B-CH frequency. The mobile stations are directed to report measured signal strengths of each of the B-CHs along with the strength of their respective serving channels. This operation expedites the data collection process and minimizes the time during which system resources are reduced.

Figure 5:
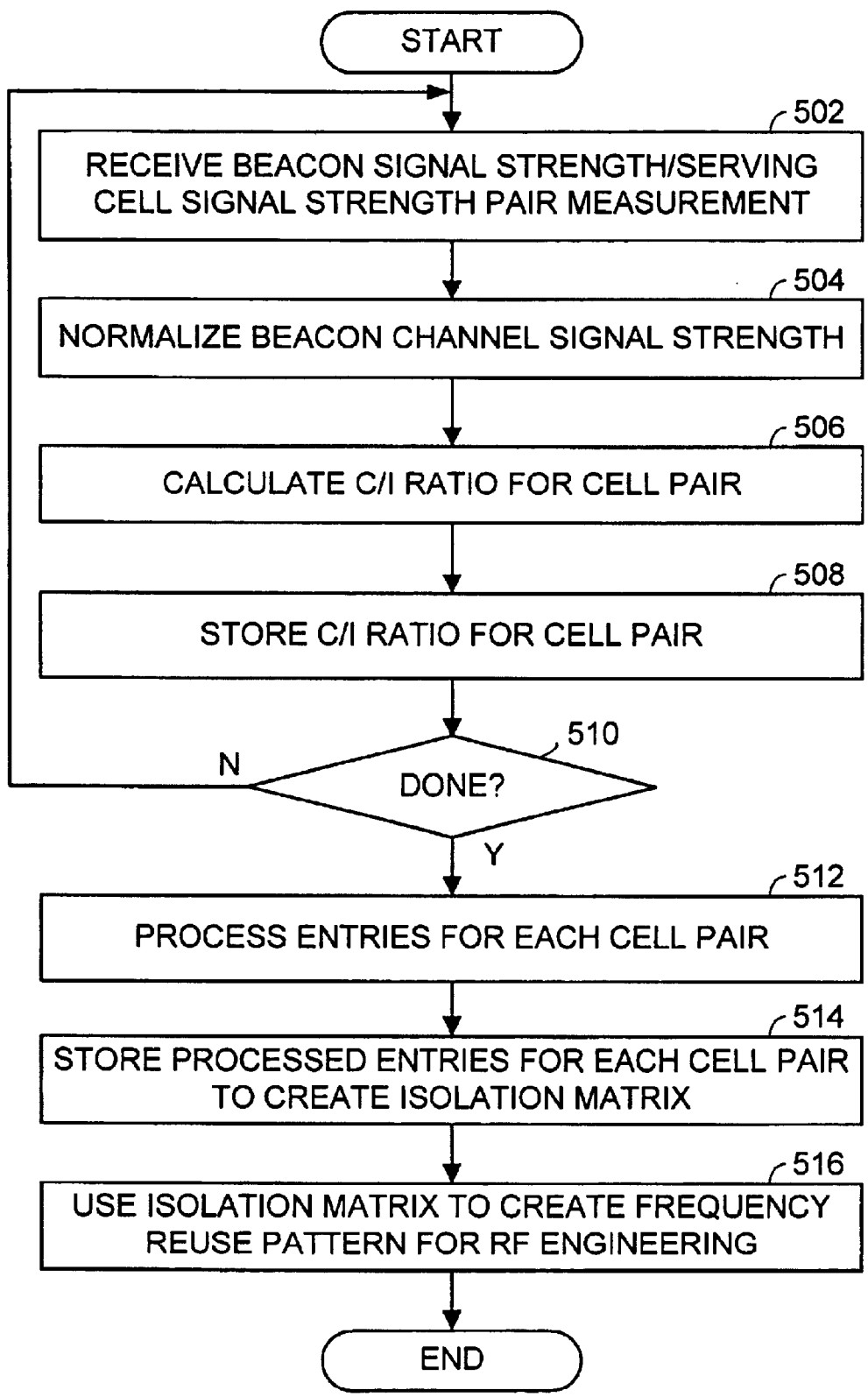
FIG. 5 is a logic diagram illustrating operation for using cell-pair RF isolation data measured according to the present invention to create an isolation matrix and to use the isolation matrix for RF reuse engineering.

FIG. 5 is a logic diagram illustrating operation for using cell-pair RF isolation data measured according to the present invention to create an isolation matrix and to use the isolation matrix for RF reuse engineering. Operation commences at step 502 wherein the signal strength of the B-CH and the signal strength of a serving RF channel are received (502). Then, the signal strength of the B-CH is normalized (step 504). Because the B-CH is typically transmitted at a power level greater than the normal transmission level of a traffic channel, it must be normalized to compute a C/I ratio for a cell (or sector) pair. For example, assume that the signal strength of the B-CH received by a mobile station is (−59 dB) while the signal strength of the traffic channel is (−45 dB). To normalize the B-CH signal strength, it is determined first that the B-CH was transmitted 12 dB above normal transmit levels. Thus, the signal strength of the B-CH is normalized to (−59 dB)−12 dB=−71 dB.

Next, the C/I ratio for the cell (or sector) pair is determined (step 506). This is determined as −45 dB−(−71 dB)=26 dB. This C/I ratio for the cell (or sector) pair is then stored (step 508). Next, at step 510, it is determined whether all signal strength measurements have been processed. If additional signal strength measurements are to be processed, operation returns to step 502 where another signal strength measurement set is received.

If all signal strength measurements have been processed, as determined at step 510, operation proceeds to step 512. At step 512, the entries for each cell (or sector) pair are processed. Because multiple mobile stations may make measurements within each cell (or sector), multiple C/I ratios are computed/stored for each cell (or sector) pair at steps 504–508. The multiple C/I ratios are combined via averaging, weighting, or other processing steps to create a combined C/I ratio for each cell (or sector) pair. Then, the processed C/I ratios are stored to create an isolation matrix (step 514). The isolation matrix is then used to create a frequency reuse pattern for the cellular system.

FIG. 6 is a system diagram illustrating a cellular wireless communication system 600 within which operation according to the present invention may be employed. The wireless communication system 600 includes mobile switching centers (MSCs) 602 and 616. Coupled to each MSC 602 and 616 is at least one base station controller (BSC). For example, BSC 604 is coupled to MSC 602 while BSC 618 is coupled to MSC 616. Finally, at least one base station couples to each BSC. As shown, base stations 606 and 607 couple to BSC 604 and provide wireless service within cells/sectors 644 and 646, respectively, while base stations 622 and 623 couple to BSC 618 and provide wireless service within cells/sectors 648 and 650, respectively. Base stations 622 and 623 are shown to support three sectors each, sectors A, B and C. However, each of the base stations may support communication within a plurality of sectors (2, 3, 4, etc.) even though such a division is not shown. The construction of cellular based wireless communication systems is generally known. Thus, the structure of such cellular wireless communication systems will not be discussed other than to explain the teachings of the present invention.

Each of the MSCs 602 and 616 is serviced by a visitor location register (VLR), 608 and 620, respectively. Further, each of the MSCs 602 and 616 couples to a home location register (HLR) 610, which stores subscriber information. The construction of VLRs and HLRs is also generally known. Thus, the operation of the VLRs and HLRs will not be discussed herein except as it applies to operation according to the present invention. A signaling path between the MSCs 602 and 616 and the HLR 610 is shown as a dotted line while the traffic paths between the MSCs 602 and 616 and the PSTN 614 are shown as solid lines. Communications between the MSCs 602 and 616 and the HLR 610 may be compliant with the IS-41 standard promulgated for North American intersystem operations.

Each of the MSCs 602 and 616 also couples to the public switched telephone network (PSTN) 614. Terminals 634 and 636 couple to the PSTN 614 and may access the wireless communication system 600 thereby. The MSCs 602 and 616 and the HLR 610 also couple to a packet data network (e.g., the Internet) 662. While not shown, the MSCs 602 and 616 typically require an interface, such as an Interworking function, to interface with the packet data network 662. As is known, most wireless communication systems support circuit switching, as opposed to the packet switching supported by the packet data network 662, such difference necessitating the Interworking function. However, in newer wireless systems, packet switching may be supported.

A system-engineering server (SES) 640 couples to either/both the packet data network 662 and MSC 602. The SES 640 interacts with the wireless communication system to collect cell pair RF isolation data according to the methodology discussed infra with reference to FIGS. 2–5 and to generate the isolation matrix.

In an operation according to the present invention, the SES 640 selects a B-CH that will be transmitted from base station 622 within sector C of cell 650. The SES 640 then directs, via corresponding MSC-BSC paths, the other base stations 606, 607 and 623 to disable operation on the B-CH. Further, the SES 640 directs base station 622 not to transmit on adjacent RF channels within sectors A and B of cell 650.

Then, the SES 640 directs the base station 622 to transmit a full power signal on the B-CH in sector C of cell 650.

The SES 640, via respective MSC-BSC paths, then instructs active mobile stations 628, 626, 630, 632 and 624 to perform measurements of the strength of the B-CH and their serving RF channels. In response thereto, the mobile stations 628, 626, 630, 632 and 624 make the measurements and return the results of the measurements to the SES 640 via respective base station-BSC-MSC paths.

Once the measurements are complete using for the B-CH transmissions of sector C of cell 650 (serviced by base station 622) a next cell/sector is chosen. For example, the SES 640 may next choose the same B-CH but transmit the B-CH from base station 622 in sector A of cell 650. In such case, use of the B-CH continues to be prevented by other base stations. Further, adjacent RF channels in sectors B and C of cell 650 and in sector C of cell 648 may be suppressed. Then, SES 640 directs base station 622 to transmit the B-CH and the mobile stations 628, 626, 630, 632 and 624 to measure the strength of their serving RE channel and the B-CH and to report the measurements to the SES 640. This pattern is completed for each cell/sector within the system 600. This pattern may also be repeated over time so that the collected data is diverse.

In another embodiment of the present invention, the functionality of the SES 640 is included with one, or both of the MSCs 602 and/or 616. In this embodiment, the MSCs 602 and/or 616 would have sufficient processing capability to perform the operations described herein. Further, the MSCs 602 and 616 would include additional elements as well, such as a time switch, a router, BSC interfaces, etc.

Figure 7:
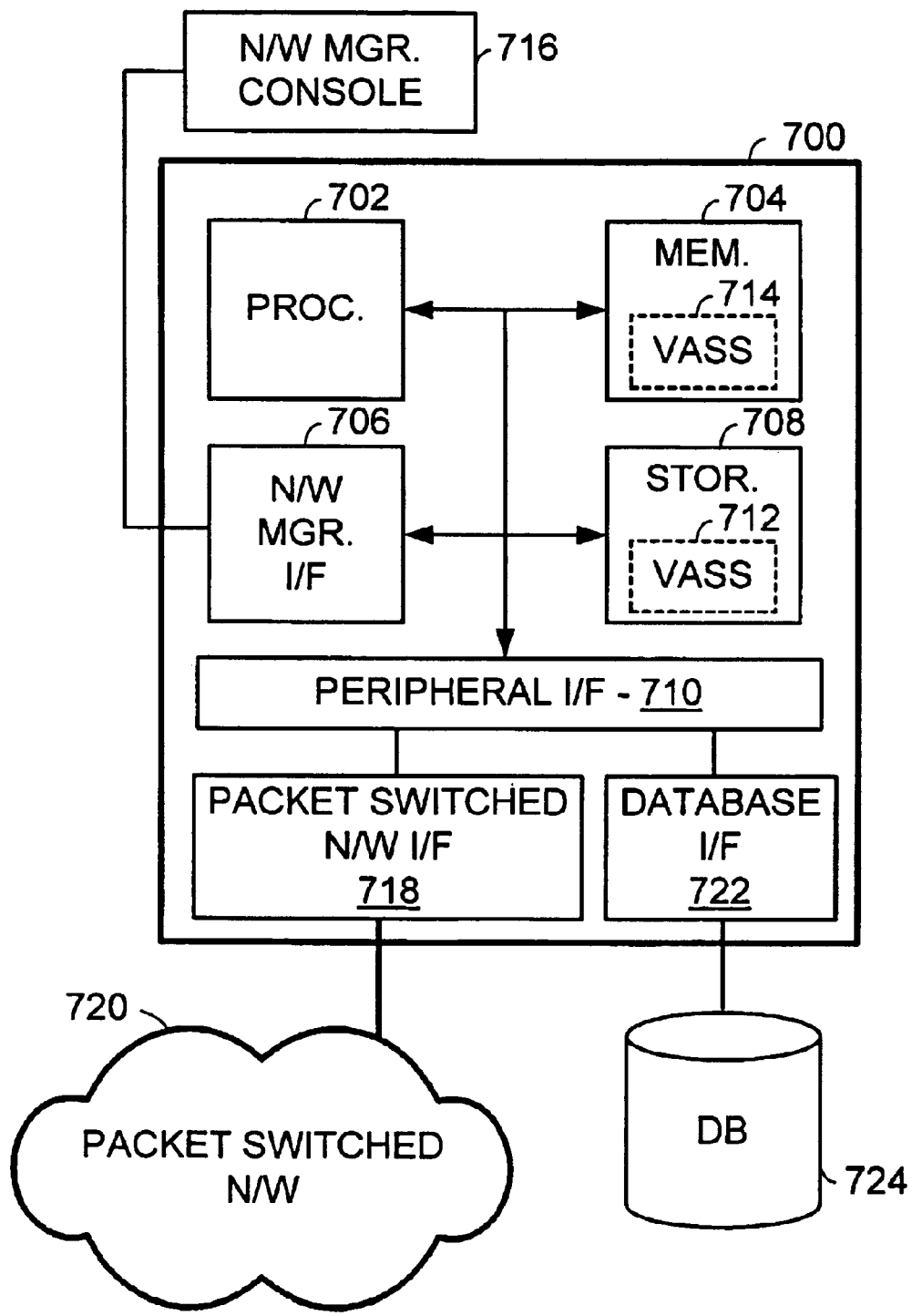
FIG. 7 is a block diagram illustrating a system-engineering server constructed according to the present invention.

FIG. 7 is a block diagram illustrating a system-engineering server 700 constructed according to the present invention. The SES 700 may be general-purpose computer that has been programmed and/or otherwise modified to perform the particular operations described herein. However, the SES 700 may be specially constructed to perform the operations described herein. In particular, the SES 700 may be the SES 640 shown in FIG. 6 that executes some, or all of the operations described in FIGS. 3–5. Alternately, the SES 700 may form a portion of one of the MSCs 602 and 616 of FIG. 6.

The SES 700 includes a processor 702, memory 704, a network manager interface 706, storage 708 and a peripheral interface 710, all of which couple via a processor bus. The processor 702 may be a microprocessor or another type of processor that executes software instructions to accomplish programmed functions. The memory 704 may include DRAM, SRAM, ROM, PROM, EPROM, EEPROM or another type of memory in which digital information may be stored. The storage 708 may be magnetic disk storage, magnetic tape storage, optical storage, or any other type of device, which is capable of storing digital instructions and data.

The network manager interface 706 couples to a network manager console 716, which allows a network manager to interface with the SES 700. The network manager console 716 may be a keypad/display or may be a more complex device, such as a personal computer, which allows the manager to interface with the SES 700. However, the network manager may interface with the SES 700 using other techniques as well, e.g., via a card coupled to the peripheral interface 710.

The peripheral interface 710 couples to a packet switched network interface 718 and a database interface 722. The packet switched network interface 718 couples the SES 700 to a packet switched network 720, e.g., the packet data network 622 of FIG. 6, the Internet or another packet switched network. The database interface 722 couples the SES 700 to an external database 724. The database stores data that is employed to perform the operations described herein.

RF Isolation Determination Instructions (RFIDIs) 712 are loaded into the storage 708 of the SES 700. Upon their execution, a portion of the RFIDIs 712 are downloaded into memory 704 (as RFIDIs 714). The processor 702 then executes the RFIDIs 714 instructions to perform the operations described herein. The programming and operation of digital computers is generally known to perform such steps. Thus, only the functions performed by the SES 700 were described and the manner in which the processor 702 and the other components of the SES 700 function to perform these operations is not further described herein.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for determining cell/sector pair radio frequency isolation values in a cellular wireless communication system the method comprising:

transmitting on a broadcast channel in a broadcast cell/sector;

disabling transmissions on the broadcast channel in neighboring cells/sectors;

directing a plurality of mobile stations operating within the cellular wireless communication system to measure be strength of the broadcast channel and to measure the strength of respective serving traffic channels;

receiving the measured strengths of the broadcast channel and respective serving traffic channels from the plurality of mobile stations;

using the measured strengths of the broadcast channel and respective serving traffic channels to determine cell/sector pair radio frequency isolation values;

normalizing a measured strength of the broadcast channel to produce a normalized broadcast channel signal strength;

calculating a cell/sector pair radio frequency isolation value using the normalized broadcast channel signal strength and a measure strength of a serving traffic channel.

2. The method of claim 1, further comprising disabling adjacent channels in the broadcast cell/sector.

3. The method of claim 1, further comprising disabling adjacent channels in at least some of the neighboring cells/sectors.

4. The method of claim 1, further comprising:

repeating the previous steps for a plurality of cell/sectors in the cellular wireless communication system to produce a plurality of measured cell/sector pair radio frequency isolation values; and processing the plurality of measured cell/sector pair radio frequency isolation values to create an isolation matrix.

5. The method of claim 1, wherein directing a plurality of mobile stations operating within the cellular wireless communication system to measure the strength of the broadcast channel and to measure the strength of respective serving traffic channels comprises issuing a mobile assisted handoff message to the plurality of mobile stations.

6. The method of claim 1, wherein directing a plurality of mobile stations operating within the cellular wireless communication system to measure the strength of the broadcast channel and to measure the strength of respective serving traffic channels may alternately comprise issuing a mobile assisted channel assignment message to the plurality of mobile stations.

7. The method of claim 1, wherein directing a plurality of mobile stations operating within the cellular wireless communication system to measure the strength of the broadcast channel and to measure the strength of respective serving traffic channels includes limiting such direction to mobile stations operating within a distance of the broadcast cell/sector.

8. A system-engineering server operating in conjunction with a cellular wireless communication system, the system-engineering server comprising:
   a processor;
   memory coupled to the processor;
   an interface coupled to the processor that allows the system-engineering system server to interact with the cellular wireless communication system; and
   the memory storing a plurality of instructions, the plurality of instructions comprising:
     a plurality of instructions upon execution by the processor, cause the cellular wireless communication system to transmit on a broadcast channel in a broadcast cell/sector;
     a plurality of instructions that, upon execution by the processor, cause the cellular wireless communication system to disable transmissions on the broadcast channel in neighboring cell/sectors;
     a plurality of instructions that, upon execution by the processor, cause the cellular wireless communication system to direct a plurality of mobile stations operating within the cellular wireless communication system to measure the strength of the broadcast channel and to measure the strength of respective serving traffic channels;
     a plurality of instructions that, upon execution by the processor, cause the cellular wireless communication system to receive the measured strengths of the broadcast channel and respective serving traffic channels from the plurality of mobile stations;
     a plurality of instructions that, upon execution by the processor, cause the cellular wireless communication system to use the measured strengths of the broadcast channel and respective serving traffic channels to determine cell/sector pair radio frequency isolation values;
     a plurality of instructions that, upon execution by the processor, cause the cellular wireless communication system to normalize a measure strength of the broadcast channel to produce a normalized broadcast channel signal strength; and
     a plurality of instructions that, upon execution by the processor, cause the cellular wireless communication system to calculate a cell/sector pair radio frequency isolation value using the normalized broadcast channel signal strength and a measured strength of a serving traffic channel.

9. The system-engineering server of claim 8, further comprising a plurality of instructions that, upon execution by the processor, cause the cellular wireless communication system to disable adjacent channels in the broadcast cell/sector.

10. The system-engineering server of claim 8, further comprising a plurality of instructions that, upon execution by the processor, cause the cellular wireless communication system to disable adjacent channels in at least some of the neighboring cells/sectors.

11. The system-engineering server of claim 8, further comprising:
   a plurality of instructions that, upon execution by the processor, cause the cellular wireless communication system to repeat the previous operations for a plurality of cell/sectors in the cellular wireless communication system to produce a plurality of measured cell/sector pair radio frequency isolation values; and
   a plurality of instructions that, upon execution by the processor, cause the cellular wireless communication system to process the plurality of measured cell/sector pair radio frequency isolation values to create an isolation matrix.

12. The system-engineering server of claim 8, wherein directing a plurality of mobile stations operating within the cellular wireless communication system to measure the strength of the broadcast channel and to measure the strength of respective serving traffic channels comprises issuing a mobile assisted handoff message to the plurality of mobile stations.

13. The system engineering server of claim 8, wherein directing a plurality of mobile stations operating within the cellular wireless communication system to mere the strength of the broadcast channel and to measure the strength of respective serving traffic channels comprises issuing a mobile assisted channel assignment message to the plurality of mobile stations.

14. The system-engineering sever of claim 8, wherein directing a plurality of mobile stations operating within the cellular wireless communication system to measure the strength of the broadcast channel and to measure the strength of respective serving traffic channels includes limiting such direction to mobile stations operating within a distance of the broadcast cell/sector.

15. A computer readable medium that stores a plurality of software instructions that, when executed by a computer interfacing with a cellular wireless communication system, causes the cellular wireless communication system to determining cell/sector pair radio frequency isolation, the computer readable medium comprising:
   a plurality of instructions that, upon execution by the computer, cause the cellular wireless communication system to transmit on a broadcast channel in a broadcast cell sector;
   a plurality of instructions that, upon execution by the computer, cause the cellular wireless communication system to disable transmissions on the broadcast channel in neighboring cell/sectors;
   a plurality of instructions that, upon execution by the computer, cause the cellular wireless communication system to direct a plurality of mobile stations operating within the cellular wireless communication system to measure the strength of the broadcast channel and to measure the strength of respective serving traffic channels;
   a plurality of instructions that, upon execution by the computer, cause the cellular wireless communication system to receive the measured strengths of die broadcast channel and respective serving traffic channels from the plurality of mobile stations;

a plurality of instructions that, upon execution by the computer, cause the cellular wireless communication system to use the measured strengths of the broadcast channel and respective serving traffic channels to determine ce/sector pair radio frequency isolation values;

a plurality of instructions that upon execution by the computer cause the cellular wireless communication system to normalize a measured strength of the broadcast channel to produce a normalized broadcast channel signal strength; and a plurality of instructions that, upon execution by the computer, cause the cellular wireless communication system to calculate a cell/sector pair radio frequency isolation value using the normalized broadcast channel signal strength and a measured strength of a serving traffic channel.

16. The computer readable medium of claim 15, further comprising a plurality of instructions that, upon execution by the computer, cause the cellular wireless communication system to disable adjacent channels in the broadcast cell/sector.

17. The computer readable medium of claim 15, further comprising a plurality of instructions that, upon execution by the computer, cause the cellular wireless communication system to disable adjacent channels in at least some of the neighboring cells/sectors.

18. The computer readable medium of claim 15, comprising:

a plurality of instructions that, upon execution by the computer, cause the cellular wireless communication system to repeat the previous steps for a plurality of cell/sectors in the cellular wireless communication system to produce a plurality of measured cell/sector pair radio frequency isolation values; and a plurality of instructions that, upon execution by the computer, cause the cellular wireless communication system to process the plurality of measured cell/sector pair radio frequency isolation values to create an isolation matrix.

19. The computer readable medium of claim 15, wherein directing a plurality of mobile stations operating within the cellular wireless communication system to measure the strength of the broadcast channel and to measure the strength of respective serving traffic channels comprises issuing a mobile assisted handoff message to the plurality of mobile stations.

20. The computer readable medium of claim 15, wherein directing a plurality of mobile stations operating within the cellular wireless communication system to measure the strength of the broadcast channel and to measure the strength of respective serving traffic channels comprises issuing a mobile assisted channel assignment message to the plurality of mobile stations.

21. The computer readable medium of claim 15, wherein directing a plurality of mobile stations operating within the cellular wireless communication system to measure the strength of the broadcast channel and to measure the strength of respective serving traffic channels includes limiting such direction to mobile stations operating within a distance of the broadcast cell/sector.

* * * * *